April 14, 1959     G. HAUMANN     2,881,811
TRIMMER SAW MACHINE AND SELECTIVE CONTROL THEREFOR
Filed April 15, 1957     4 Sheets-Sheet 1

INVENTOR.
George Haumann
BY
Ramsey and Kolisch
Attys.

April 14, 1959 G. HAUMANN 2,881,811
TRIMMER SAW MACHINE AND SELECTIVE CONTROL THEREFOR
Filed April 15, 1957 4 Sheets-Sheet 2
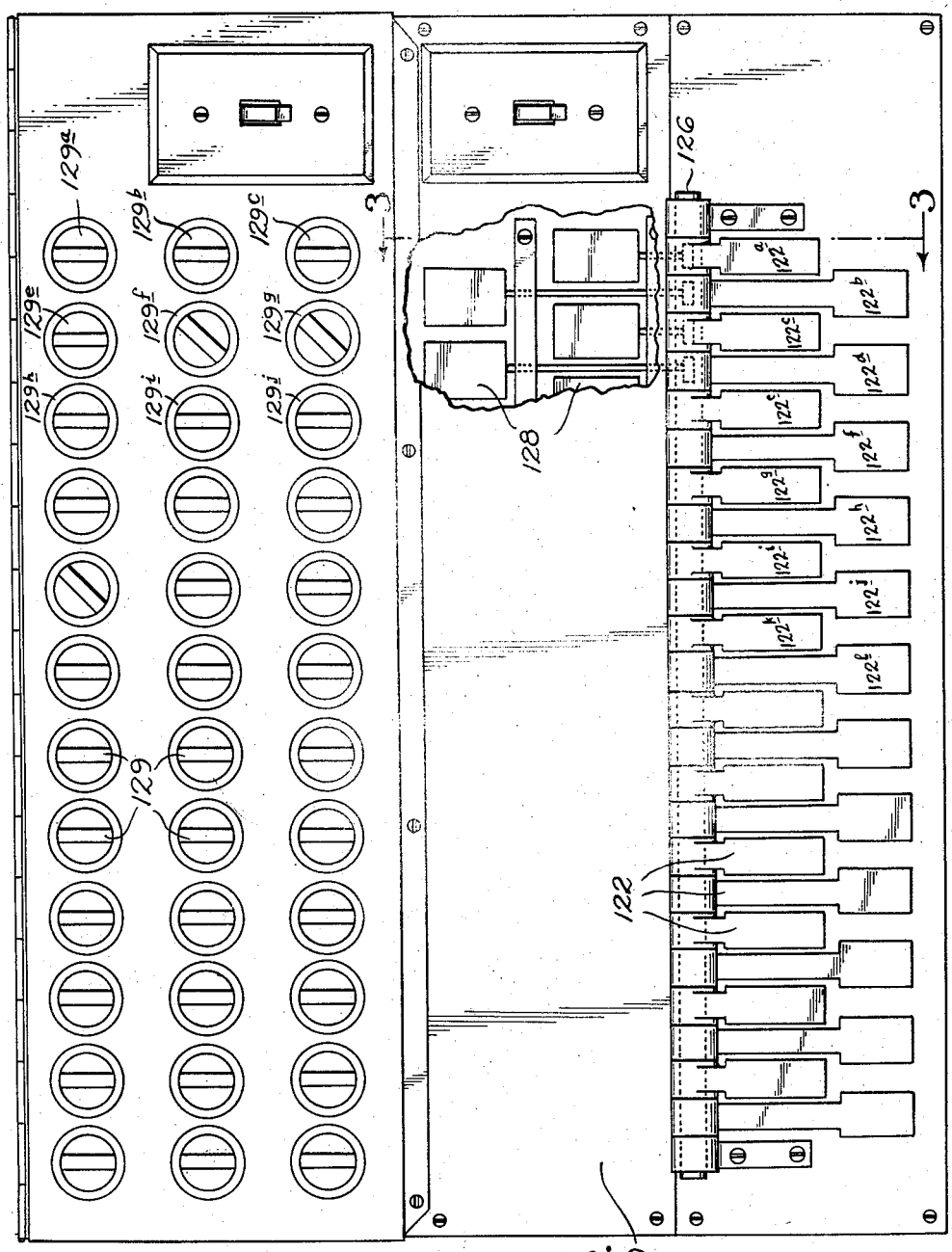
INVENTOR.
George Haumann
BY
Ramsey and Kolisch
Attys.

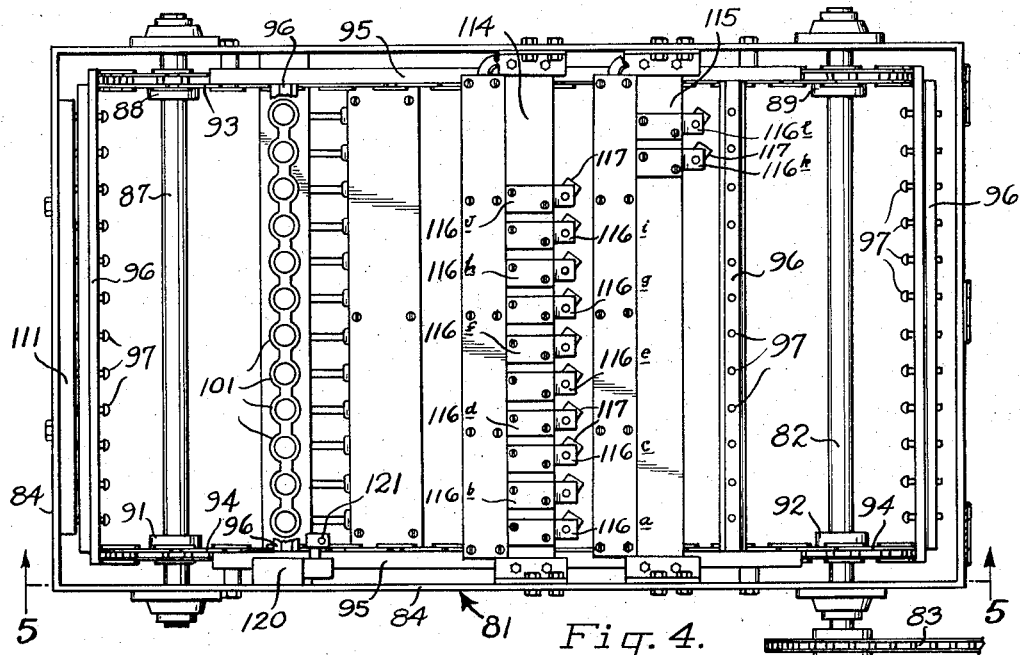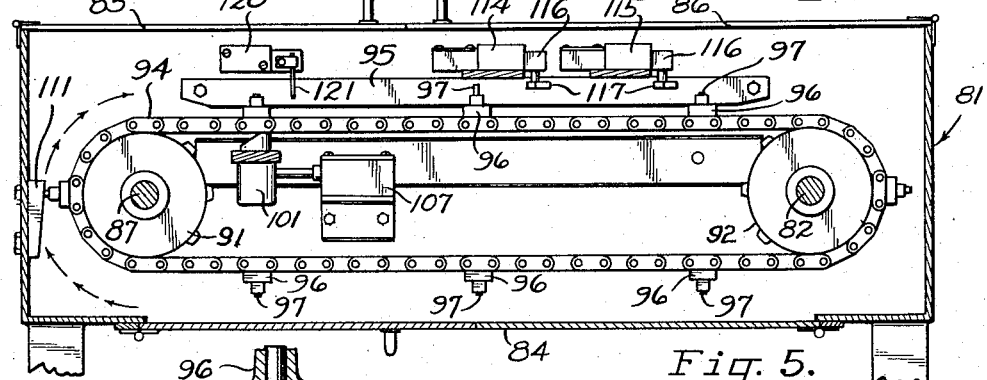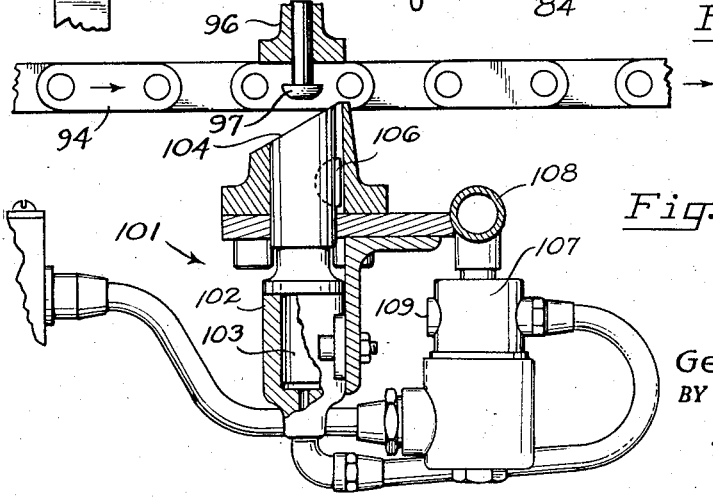

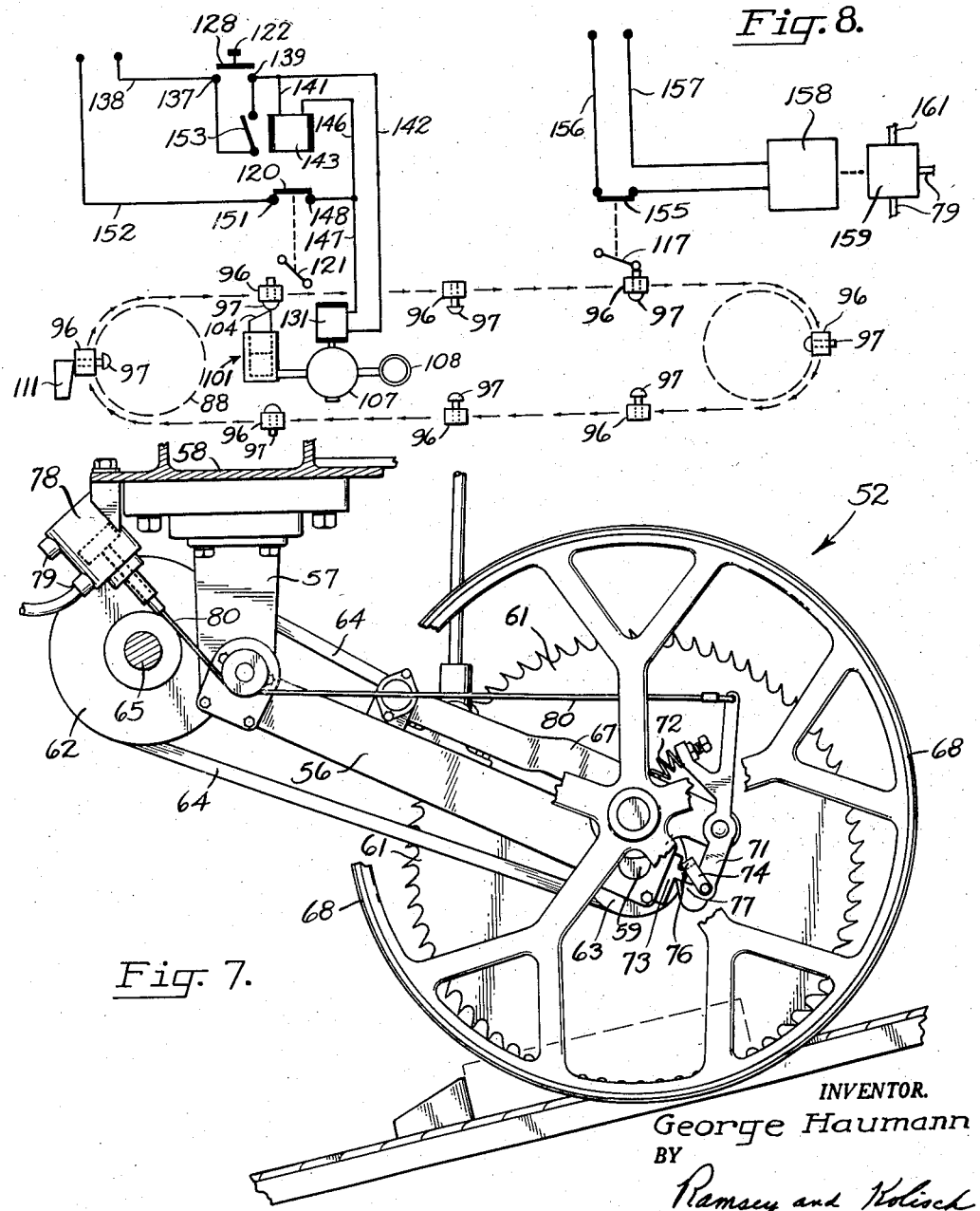

United States Patent Office 2,881,811
Patented Apr. 14, 1959

2,881,811

TRIMMER SAW MACHINE AND SELECTIVE CONTROL THEREFOR

George Haumann, Portland, Oreg., assignor to Irvington Machine Works, Inc., a corporation of Oregon Application April 15, 1957, Serial No. 653,015

9 Claims. (Cl. 143—41)

This invention relates to lumber trimmer saw machines and more particularly to mechanism for controlling the trimmer saw mechanisms of the machine and selectable while lumber moves past an inspection station preceding or on the infeed side of the saw mechanisms in the trimmer saw machine. The controlling or regulating mechanism not only affords the opportunity to designate the saws which are to perform a cut prior to the entry of a piece of lumber into the trimmer saws, but also enables an operator to set up in advance other work functions to be performed on the lumber after it leaves the trimmer saw machine and advances in the processing line as, for instance, machines grading, sorting, or marking the lumber. Thus the regulating mechanism, in conjunction with a trimmer saw machine, permits an operator to determine the particular saw or saws to be used in severing a board and, in addition, to select mechanism classifying, marking, or otherwise performing work on the board subsequent to the trimming action, the selecttions by the operator being made as the lumber moves through an inspection station within easy view of the operator.

Illustrative of the trimmer saw machines with which this invention may advantageously be employed are those having a plurality of power-driven circular saws arranged in a gang with means for adjusting one or more of the saws so that when lumber travels past the gang, the saw or saws selected engages and cuts into the lumber thereby to trim or sever the lumber. In present day trimmer saws, commonly each saw of the gang is provided with an associated rider wheel spaced laterally from the wheel and having a somewhat larger diameter than the saw. The saw and the rider wheel are connected together by a detachable mechanism provided between the saw and its associated rider wheel. The detachable mechanism connects the saw and rider wheel for movement together and may be disconnected to enable the saw and rider wheel to move independently of each other. If a piece of lumber is to pass beneath a saw without being cut, the rider wheel is left connected to the saw so that the wheel rides over and lifts the saw from the lumber, preventing the saw from cutting the lumber. On the other hand, if a cut is to be made, the saw is disconnected from its rider wheel, and the lumber is severed by the saw while the rider wheel is permitted to ride over and across the lumber without lifting the saw.

A machine of this type oftentimes is quite bulky and complex with the result that the machine obscures the vision of the operator controlling the saws as lumber is transported beneath the saws. Thus, when it is desired to trim the end of a piece of lumber or to trim intermediate portions because of knots, pitch pockets, or imperfections contained therein, with conventional equipment, it is a requirement that the operator peer around the saw mechanisms so as to be able to observe substantially simultaneously with the cutting operation the lumber as it passes into the trimmer saws so that he may adjust properly the trimmer saws which are to make a cut. The operator must be careful not to adjust the saw mechanisms for cutting a succeeding piece of lumber until the preceding piece has been completely cut. This has required a considerable degree of skill on the part of the operator and also has necessitated that the trimmer machine be run at a relatively slow speed to give the operator time to make his selections. Further, the operator has had to give his entire attention to the operation of the trimmer saw machine without devoting any of his attention to subsequent operations performed on the lumber such as sorting or grading, which ordinarily occurs after the lumber has been trimmed.

This invention contemplates the provision with a trimmer saw machine of a regulating means wherein lumber is moved past an inspection station in ready view of the operator prior to its entry into the trimmer saw mechanisms. The regulating means includes means selectable as the lumber passes the inspection station controlling the gang of saws in the trimmer saw machine, which comprise the work station of the trimmer saw machine. While the selection is made when the lumber passes the inspection station, the saw mechanisms in the work station are not adjusted to an operating or cutting position until the lumber is moved past the inspection station adjacent the work station. That is to say, a time delay is introduced between the time the selections are made and the time that these selections are transmitted to the individual saw mechanisms of the trimmer saw. By such a construction, the setting of the saw mechanisms in the trimmer saw machine is greatly facilitated as no longer is it required to make a close inspection of a piece of lumber and the trimmer saws immediately prior to the entry of the lumber into the work station of the machine. Further, a greater speed of operation is possible by reason of the fact that an operator makes his adjustments as the lumber passes the inspection station, and these adjustments are transmitted to the saw mechanisms of the trimmer machine only for such an interval as is necessary to perform the required trimming of the lumber. In this manner, successive pieces of lumber may be passed through the machine at a far faster rate than was previously possible.

As a further consideration, the construction of this invention enables the operator not only to select in advance the trimmer saw mechanisms which are to trim the lumber, but also enables the operator to select other work functions which it may be desired to have performed on the lumber subsequent to the trimmer machine. As an example, a tripple or other machine may be included in the processing line for the lumber after the trimmer saw machine for separating pieces of lumber as they leave the trimmer saw. This invention contemplates a control mechanism operable properly to regulate subsequent work functions of this sort which may be set up and selected at the time the lumber passes the inspection station but wherein the control signal for the machine performing the work is delayed until such time as the piece of lumber inspected is transported out of the trimmer saw machine and along the processing line. In this way, an opportunity is afforded to select a large number of operations to be performed on a piece of lumber prior to trimming the lumber, thereby eliminating the need for multiple inspection stations arranged along the processing line.

It is an object, therefore, of this invention to provide for a trimmer saw machine having a plurality of power-driven saw mechanisms making up the work station for the machine, a transfer mechanism on the infeed or delivery side of the work station for the trimmer saw machine and a regulator means co-ordinated with the transfer mechanism for controlling the operation of the power-driven saw mechanisms. The regulator means is selectable as the lumber passes an inspection station located in front of the work station for the trimmer saw and is operable to adjust the power-driven saw mechanisms into operative position after the piece of lumber inspected passes the inspection station.

More specifically, this invention contemplates a transfer mechanism having a series of feed chains arranged with lugs carried in rows by the chains and operable to move pieces of lumber one at a time into the work station for the trimmer saw machine. The regulator means includes a series of control bar members moving in a path conjointly with and at a rate of speed related to the movement of the feed chains for the transfer mechanism. Each of the control bar members has a series of remotely actuatable trigger means which may be adjusted from a base or rest position to an energizing position as the control member carrying the trigger means passes a setting station located in the regulator means. The control members of the regulator means correspond to the rows of lugs arranged on the feed chains and move past the setting station at a speed co-ordinated with the speed of the lugs of the transfer mechanism moving past the inspection station. Intercepter means engaging the trigger means as they move in their path onwardly from the setting station of the regulator means function to adjust the saw mechanisms of the trimmer saw into operative position upon engaging the trigger means. These intercepter mechanisms are spaced from the setting station so that they are engaged by the trigger means at approximately the time the lug means transporting a piece of lumber enters into the work station of the trimmer saw.

A more specific object of this invention, therefore, is to provide for a trimmer saw machine transfer mechanism and regulator mechanism transporting pieces of lumber into the machine wherein the regulator mechanism includes trigger means moving in a path conjointly with and at a rate of speed related to the speed of the transfer mechanism and operable to engage intercepter means located in the path of the trigger means so as to adjust the saw mechanisms of the trimmer saw machine to an operative position, the trigger means engaging the intercepter means at approximately the interval that a lumber piece enters into the work station for the trimmer saw machine.

Yet another object of the invention is to provide a novel means for moving or activating the trigger mechanisms of this invention from their base to their energizing positions and, more specifically, to provide such means including a plurality of fluid operated motors each activating one of a series of trigger mechanisms in the regulating unit, each of the fluid motors being independently operable to move a trigger mechanism associated therewith to its energizing position, the regulator means including mechanism for returning each fluid operated motor, after activating a trigger means, to its original rest position preparing the fluid motor for activation of a subsequent trigger mechanism.

These and other objects and advantages are attained by the present invention, the invention being described hereinbelow in conjunction with the accompanying drawings wherein:

Fig. 1 is a simplified top view of a trimmer saw machine having a gang of trimmer saw mechanisms at one end thereof forming the work station for the machine, transfer mechanism transporting lumber into the infeed end of the work station for the trimmer saw machine, and the general location of the selector box and control mechanism correlating the adjustment of the saw mechanisms in the work station of the trimmer saw machine with the feed of the transfer mechanism for the machine;

Fig. 2 is a more detailed view of the selector box or keyboard used for controlling operation of the control mechanism;

Fig. 3 is a view broken away along the line 3—3 in

Figure 1:
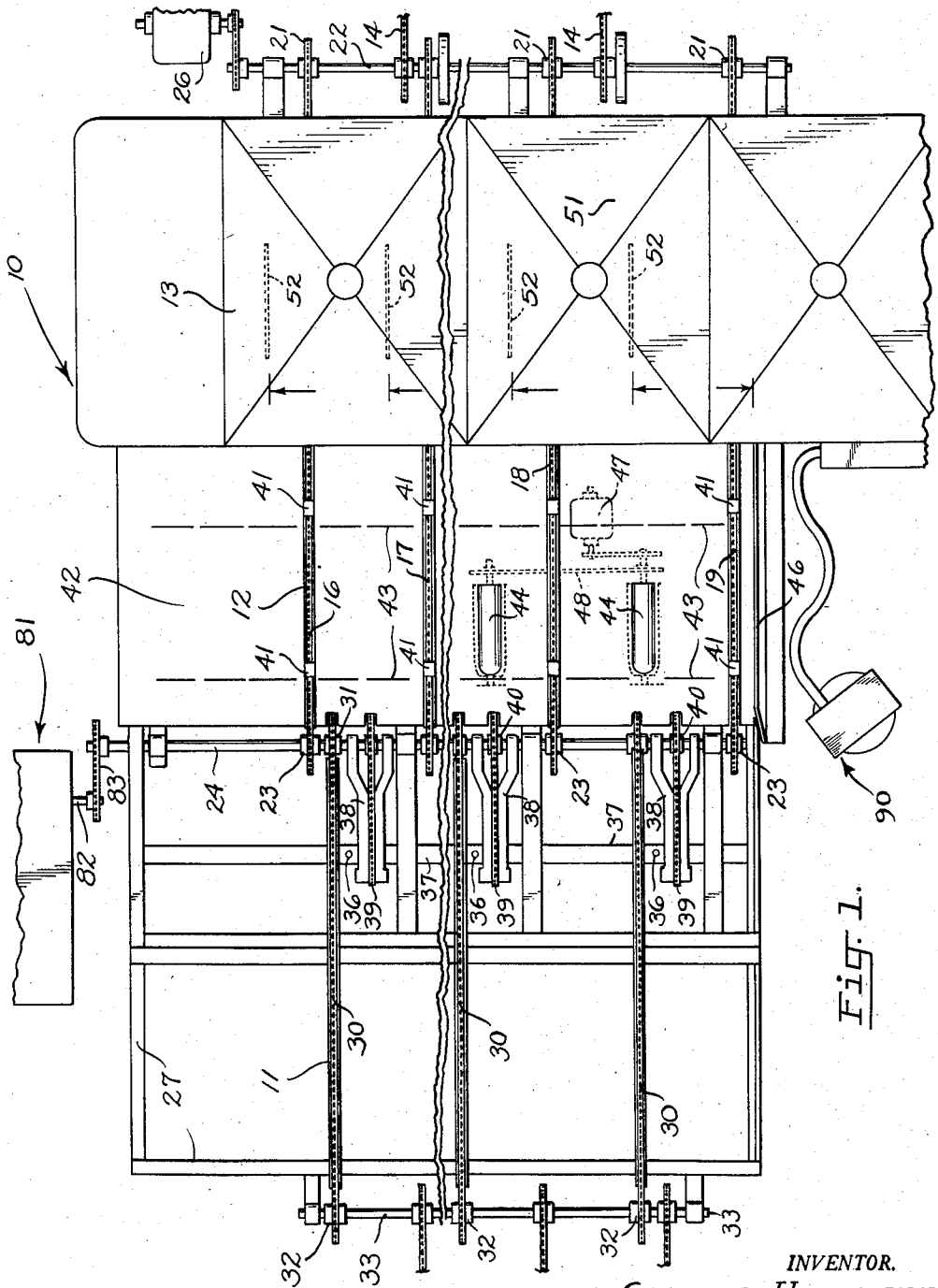

Fig. 2, illustrating the connections of the keys in the selector box with the switches controlled thereby;

Fig. 4 is a top view, more in detail, of the regulator or control mechanism of this invention;

Fig. 5 is a section view along the line 5—5 in Fig. 4;

Fig. 6 is an enlarged view of the fluid motor mechanism employed for moving a trigger mechanism of this invention from its base to its energizing position;

Fig. 7 is a side elevation of one unit in the gang of trimmer saw mechanisms in the trimmer saw machine, portions of the frame being shown in section and with parts removed for reasons of clarity; and Fig. 8 is a schematic showing of a control circuit such as may be used in this invention.

Referring to the drawings wherein an embodiment of this invention is illustrated, and more particularly to Fig. 1, 10 indicates generally a trimmer saw machine having a pair of lumber transfer mechanisms 11 and 12 placed in series with each other and transporting lumber into the infeed side of a work station 13 of the trimmer saw machine. Outfeed conveyer chains 14 transport lumber passed through the trimmer saw down the processing line for the lumber where the lumber may be graded, stamped, or otherwise worked upon.

Transfer mechanisms 11 and 12 are conventional. In the embodiment illustrated, transfer mechanism 12 comprises four feed chains 16, 17, 18, and 19 reeved at their forward ends about a series of sprockets 21 which are affixed to a head shaft 22 and at their rear ends about sprockets 23 mounted on a tail shaft 24. Drive is transmitted to chains 16—19 in any suitable manner as by electric motor 26 drivingly connected to head shaft 22.

Tail shaft 24 is rotatably mounted in frame structure indicated generally at 27. Sprockets 23, engaging the rear ends of chains 16—19, are rotatably mounted on the tail shaft save for one of the sprockets which is affixed to the tail shaft for rotation therewith thereby to transmit drive from the head shaft to the tail shaft. Commonly, this may be one of the end sprockets such as the sprocket engaging feed chain 16 on tail shaft 24.

Transfer mechanism 11 has illustrated a series of feed chains 30 reeved about sprockets 31 located at the forward ends of the feed chains and affixed to tail shaft 24 for rotation therewith. The rear ends of feed chains 30 engage another series of sprockets 32 mounted on a shaft 33. Conventionally, sprockets 32 are rotatably mounted on shaft 33 save for one of the sprockets which may be affixed to the shaft for transmitting drive from the tail shaft to shaft 33.

Referring again to Fig. 1, lumber is fed into the trimmer machine from the left hand side of the machine as viewed in Fig. 1. Thence, lumber is carried by feed chains 30, which are rotating with their upper surfaces traveling to the right in Fig. 1, until it engages a series of perpendicular abutments 36 which strike the leading edge of a piece of lumber thereby to halt its movement. These abutments may be mounted in any suitable manner as by securing them to a frame member 37. Ordinarily, the abutments would be mounted so as to accommodate adjustment of the abutments longitudinally along the length of the machine to compensate for different widths of the lumber. Thus in the embodiment illustrated, frame member 37 would be adjustable longitudinally of the machine.

A series of load arms 38 are pivotally mounted upon tail shaft 24 for movement of their nonpivoted or free ends upwardly from a position below the level of feed chains 30 to a position above the level of the feed chains. These load arms function to pick off pieces of lumber one at a time carried on feed chains 30 and thence deliver the lumber pieces to transfer mechanism 12. Each of the load arms includes a transfer chain 39 geared to a sprocket 40 affixed to tail shaft 24. In their lowered position, lumber stacks up against abutment members 36, and upon raising the load arms simultaneously, the piece of lumber directly over the nonpivoted ends of the load arms is raised from feed chains 30 clear of abutment members 36 so as to be carried by transfer chains 39 forwardly into contact with feed chains 16—19. Pivotal movement of the load arms is controlled in any suitable manner such as by a cam means carried by each of the load arms and an eccentric rotatable with the tail shaft and engaging the cam means to periodically pivot the load arms on rotation of the load shaft. Load arm mechanism of the type described, operable to pick pieces of lumber off from a moving conveyer system, is described in detail in United States Patent No. 2,679,919, issued to Edwin W. De Koning, June 1, 1954, and reference may be had to that patent for load arm mechanism suitable for use in this invention.

With reference again to Fig. 1, feed chains 16—19 are each provided with a series of lug members 41 affixed to the feed chains and spaced thereon at intervals so as to form a series of rows of lug members. Each row of lug members transports a piece of lumber edgewise or transversely of its length over a bed 42 of the transfer mechanism and thence into the work station for the trimmer saw machine. In moving across bed 42, the lumber pieces are moved past an inspection station, indicated in the drawings by the enclosure bounded by dotted lines 43.

Transfer mechanism 12 is provided with a series of crowding rolls 44 tapered at their forward ends to allow pieces of lumber to ride over their forward ends and operable to exert a sideways thrust on a piece of lumber so as to force the end of a piece of lumber against a fence 46 disposed at one side of the machine. Crowding rolls 44 may be driven in any suitable manner as by motor 47 connected by chain 48 to sprockets driving the crowding rolls.

The work station for the trimmer saw machine may take conventional form. In the embodiment illustrated, the work station is comprised of a hood structure 51 overlying a gang of power-driven saw mechanisms 52 indicated in Fig. 1 by the dotted outlines of the saws in the mechanisms. Reference is made to United States Patent No. 2,711,197, issued to Edwin W. De Koning, June 21, 1955, illustrating an automatic and selector trimmer saw mechanim, for a description of a saw mechanism such as may be employed in this invention. Briefly, referring to Fig. 7, each of the power-driven saw mechanisms comprises a ladder 56 swingably supported as by bracket 57 to frame structure 58 of the trimmer saw machine. Ladder 56 carries at its free end a saw arbor 59 mounting a circular saw 61. The saw is driven as by pulleys 62 and 63, belt 64, and drive shaft 65, connected to a suitable power source which may take the form of an electric motor driving drive shaft 65. An auxiliary arm 67 pivotally secured to the ladder intermediate its ends rotatably carries at its free end a rider wheel 68.

Circular saw 61 is detachably connected to auxiliary arm 67 so that the saw either rides up over a piece of lumber with the rider wheel when a piece of lumber passes beneath the rider wheel, or, if detached therefrom, the rider wheel moves up and is pivoted on arm 67 independently of the saw as the saw passes through a piece of lumber. To this end, a latch member 71 is pivoted on the outer end of arm 67 which is pivoted in a counterclockwise direction against the bias of a spring 72 to release the saw from the rider wheel, the latch member swinging clear of a keeper 73.

In the mechanism illustrated, means are provided for holding the latch out of engagement with the keeper once the latch member has been adjusted to a release position to enable the rider wheel to move upwardly independently of the saw irrespective of whether a counterclockwise thrust is maintained imparted to the latch member. To this end, a bail or shield 74 is pivoted on the lower end of the latch member, operable to swing down between the latch member and the keeper once the latch member has been moved to a release position, with the end of bail 74 abutting against the forward end of keeper 73 so as to retain the rider wheel and saw disengaged. A shoulder 76 of the bail strikes protrusion 77 of the latch member when the bail is free to move downwardly relative to the latch member, preventing the bail from swinging over and beyond the protrusion. The arrangement described automatically permits the resetting of the bail or shield above the latch member to the position shown in Fig. 7 after an operating cycle since relative movement of arm 67 upwardly relative to the ladder supporting the saw functions to move the end of the bail member out of end engagement with the end of keeper 73, thereby enabling spring 72 to swing the latch member in a clockwise direction in Fig. 7 so that upon the return movement of the rider wheel, the parts assume the original position illustrated in Fig. 7.

A fluid operated motor 78 having pressure fluid connections 79 is provided for moving the latch member from the position shown in Fig. 7, which is the inoperative position for the saw mechanism, out of engagement with keeper 73, which constitutes the operative position for the saw mechanism. Motor 78 acts upon a cable 80 connected to latch member 71.

As indicated hereinabove, control or regulating means are provided so that the operation of the individual saw mechanisms in the work station of the trimmer saw machine may be determined and selected when lumber pieces pass the inspection station 43, the saw mechanisms so selected not being adjusted into operative position until after the lumber piece viewed by the operator leaves the inspection station to enter the work station for the trimmer saw machine. The regulating mechanism also accommodates the selection of other work functions to be performed on the piece of lumber after it passes out of the trimmer saw machine.

Referring to Fig. 1, at the upper part of the drawing, to one side of transfer mechanism 11 of the machine, is a regulator unit indicated generally by the numeral 81. This unit is driven by a regulator drive shaft 82 drivingly connected to tail shaft 24 to be driven by the tail shaft as by chain 83. At the other side of the transfer mechanism, in view of inspection station 43, is a selector box 90 for controlling the operation of the regulator mechanism.

Referring now in particular to Figs. 4 and 5, regulator unit 81 comprises a suitable casing 84 including a pair of removable cover members 85 and 86 hinged to the casing over the top thereof. Regulator drive shaft 82 is rotatably mounted at one end of the casing, and co-operating therewith at the other end of the casing is a complementary shaft 87. Near the outer ends of shafts 82 and 87 and affixed thereto are a set of sprockets 88, 89, and near the inner ends of the shafts are another set of sprockets 91, 92, respectively. Chains 93 and 94, reeved about sprockets 88, 89, and 91, 92, respectively, transmit drive from the regulator shaft to shaft 87. As mentioned hereinbefore, chain 83 transmits drive from tail shaft 24 to shaft 82 so that chains 93 and 94 of the regulator unit are driven conjointly with and at a speed related to the speed of feed chains 16—19.

Carried by chains 93 and 94, and extending between the chains at spaced intervals along the chains, are a series of control bar members 96. These control bar members are spaced at regular intervals and are carried along a continuous path within the control unit casing by chains 93 and 94 as these chains rotate with tail shaft 24. Guide rails 95, on either side of the casing, ride on the upper surfaces of the ends of the control bar members, maintaining the bar members in more or less a horizontal plane as they travel across the upper portion of casing 84.

The control bar members are spaced about chains 93 and 94, and the chains are rotated at a speed so that as the chains are rotated, successive control bar members move past an observer stationed to one side of the unit at the same rate as successive rows of lugs secured to feed chains 16—19 move past inspection station 43. In this manner, when a row of lugs moves across inspection station 43 of transfer mechanism 12 toward the work station of the trimmer saw machine, it has a corresponding bar member moving to the right in the control unit functioning to direct work operations to be performed on a piece of lumber carried by the lugs at a time subsequent to the time the lumber passes the inspection station.

Each of the control bar members carries a series of trigger members or pins 97 mounted for reciprocation up and down in the control bar member and frictionally retained in the control bar member. The pins have rounded inner ends, and these inner ends protrude inwardly of the inner surface of the control bar members.

It will be noted that each of the control members carries an equal number of trigger pins. Also, each pin of one control member has a corresponding pin in each of the other control members aligned with the pin in its movement along its path in the control unit. Thus, each series of aligned pins moves in a common channel through the control unit. Each of the adjustable power-driven saw mechanisms in the trimmer saw is controlled by the pins of a separate channel in the control unit. Thus, in Fig. 4, the lowermost trigger pin in the drawing in each control bar member makes up one channel in the control unit, and this channel may be used for controlling the lowermost circular saw in Fig. 1; the pin adjacent to the lowermost pin in each control bar member makes up another channel in the regulator unit, and this channel may be used in controlling the saw adjacent to the bottommost saw in Fig. 1, etc. In the embodiment illustrated in Fig. 4, ten channels are provided for operating ten circular saws, and two channels are provided for performing subsequent work functions on a piece of lumber after leaving the trimmer saw machine.

Arranged in a bank and constituting a setting station near one end of the regulator unit, adjacent the path of the control bar members after they leave the sprockets attached to shaft 87, are a series of fluid motors 101. These fluid motors are arranged so as to contact, when in their extended position, the lower, rounded ends of the trigger pins thereby to move the trigger pins upwardly in the control bar members. A fluid motor is provided for each of the channels in the regulator unit.

Referring in particular to Fig. 6, each of the fluid motors comprises a cylinder 102, a piston 103 reciprocating in cylinder 102, and a cammed end 104 mounted for reciprocation up and down into and away from the path of the lower end of trigger pins 97. The cammed end is maintained in suitable position with its bevel facing the advance of the conveyer chain as by key 106 sliding in a suitable slot provided in the cammed end. The fluid motors are movable from the position shown in Fig. 6, which is their retracted position, to an expanded position wherein the cammed end 104 abuts and therefore moves up the lower, rounded end of a trigger pin striking the cammed end.

Control means are provided for each of the fluid motors including an electric solenoid operated valve 107 controlling the inlet and exhaust of air from conduits 108 and 109, respectively. For simplicity, valve 107 is shown only as a block in Fig. 5.

Pins 97 are moved upwardly in their control bar members by the fluid motors described and remain in their upper extended position, which is their energizing position, until the control bar member carrying the pin travels around the rear end of the unit to come in contact with a trigger pin return plate element 111 fastened to the rear wall of the casing for the unit and extending transversely across the unit. Return plate 111 has a beveled forward edge operable to slide against and wedge inwardly any pins which are in their extended position before entering into the operating zone of the trigger return plate.

Spaced at intervals along the top travel of the chains carrying the control bar members are rows 114 and 115 of a series of intercepter units 116. These intercepter units each have a pivotable finger 117 engaged by the trigger pins when they are in their extended position and operable to actuate mechanism performing work functions on the lumber carried through the saw and to subsequent points in the processing line.

The control unit illustrated in Fig. 4 has ten channels for controlling ten power-driven circular saw mechanisms and two channels for controlling subsequent operations performed on the lumber after the trimmer saw machine. The intercepter units for the ten channels are arranged in row 114 and are indicated by designations 116a through 116j, respectively. The intercepter units controlling work functions performed after the lumber leaves the trimmer saw machine are indicated at 116k and 116–l. The trigger pins and intercepter units thus comprise a detection means actuated by actuation of the fluid motors for adjusting the saw mechanisms into operative position after actuation of the detection means.

Referring again to Fig. 5, in the path of the control bar members as they move within the control unit slightly in front of the bank of fluid motors is a fluid motor release switch 120 having pivotable release finger 121. As described hereinbelow, the fluid motors are so arranged that when actuated by a suitable selector key, they move to their extended positions and remain in this position until a control bar member strikes release finger 121. Upon striking the release finger, the fluid pistons in all the fluid motors which have been extended return to their base or rest positions, preparing them to be reactuated prior to the movement of a subsequent control bar member over the fluid motors.

With reference now in particular to Figs. 2 and 3, Fig. 2 illustrates in more detail the keyboard of selector box 90 such as may be used in controlling the regulator mechanism of this invention. As illustrated in Fig. 2, the keyboard includes a plurality of pivotally mounted keys or selector members 122 staggered along the top of the box. Each of the keys is pivoted in the keyboard as on pivot rod 126 with a lower dependent arm 127 (see Fig. 3) functioning to operate a switch indicated generally at 128. Above the bank of keys in the selector box are a series of switches 129. The switches 129 may be employed for other control purposes not discussed herein. A control circuit to be described below connects the keys 122 to motors 101, whereby the keys regulate the motors. Certain of the keys 122, for example keys 122a—122j may be connected to the bottom ten fluid motors 101 in the unit shown in Fig. 4, for controlling the pins engaging intercepter units 116a—116j, and thus the operation of ten circular saws in the trimmer saw machine. Other keys, exemplified by keys 122k and 122–l, may be connected to the top two fluid motors in the unit shown in Fig. 4 to control the pins engaging intercepter units 116k and 116–l in the top two channels of the control unit in Fig. 4.

The control system for the control unit of this invention is illustrated diagrammatically in Fig. 8. In the schematic diagram, the control system for only one of the keys 122 is illustrated, as the control systems for the remaining keys 122 may be identical to the one illustrated. Referring to the figure, 96 indicates the control bar members which are moving along in a path and about the outer edges of sprockets 88 and 89. The numeral 111 indicates the return plate, and the trigger pins are indicated generally at 97. A fluid motor is indicated at 101, the fluid motor being controlled by valve 107.

Valve 107 is operated by a solenoid 131 ganged to the valve. Solenoid 131, as well as the other solenoids discussed herein, are conventional solenoids having a movable armature which is spring biased to one extreme position so as to describe a to-and-fro movement when energized and de-energized, respectively. Solenoid 131, when energized, operates to adjust valve 107 so as to admit air under pressure into fluid motor 101 and when de-energized adjusts valve 107 so as to exhaust fluid from the pressure cylinder of motor 101.

Key 122 (Figs. 2 and 8) operates switch 128, indicated in the drawing as a two-point switch. Switch contact 137 of switch 128 is connected to a source conductor 138, and switch contact 139 of switch 128 is connected by conductors 141 and 142 to a holding solenoid 143, and solenoid 131 ganged to valve 107, respectively. The other ends of solenoids 143 and 131 are connected by conductors 146 and 147 to switch contact 148 of switch 120, discussed hereinabove. Switch contact 151 of switch 120 is connected to another source conductor 152.

Connected parallel to switch 128 is a holding switch 153 ganged to solenoid 143 and closed by the solenoid when the solenoid is energized.

From the above description, it will be apparent that when key 122 is depressed, switch 128 is closed energizing solenoids 143 and 131. Upon release of the key and thereby switch 128, solenoid 143 maintains holding switch 153 in a closed position so that solenoid 131 continues to be energized. In its energized position, solenoid 131, which operates valve 107, adjusts the valve to admit pressure fluid into fluid motor 101 so that the cammed end associated with motor 101 is raised to engage the rounded end of a trigger pin passing thereabove.

Pivoted releasing finger 121 is connected to and controls switch 120. As the control bar moves past the pivoted release finger, it operates to pivot the finger so as to break switch 120, de-energizing solenoids 143 and 131. When solenoid 131 is de-energized, the valve controlled by the solenoid operates to exhaust air from the piston-cylinder controlled thereby so that the cammed end associated therewith subsides to its original or rest position.

Trigger pins 97 remain in their extended or energizing position until moved by the control member carrying the trigger pins into contact with trigger return plate 111. In moving in their path at a speed corresponding to the speed of the control bar members, the trigger pins are operable, when extended, to engage and thereby actuate the intercepter units arranged in their path.

For the purposes of explanation, the trigger pins illustrated in Fig. 8 will be assumed to be the trigger pins traveling in the first or lowest channel illustrated in Fig. 4. A trigger pin occupying its energizing position travels within the control unit, and after a time interval determined by the rate of travel of the control bar member, the upper portion of the pin strikes pivotable finger 117 of the intercepter unit positioned above the path of the trigger pin.

Describing the interceptor unit circuit, as indicated in Fig. 8, finger 117 is ganged to and controls a two-point switch 155. Switch 155 makes and breaks the circuit between source conductors 156 and 157. When switch 155 is closed, a motor 158, which in this instance would be a solenoid, is energized. Motor 158 is ganged to a control valve 159, regulating the supply of air pressure from a conduit 161 delivered to conduits 79 of motor 78 (not shown in Fig. 8). As discussed hereinbefore, motor 78 operates to disconnect latch member 71 of a trimmer saw mechanism thereby to set the trimmer saw mechanism in an operative position.

A trigger pin moving in one of the top two channels in Fig. 4 and occupying an energizing position strikes pivotable finger 117 of the interceptor unit in the channel at some time interval after the control bar member carrying the pin moves past the interceptor units of row 114. This is so since the interceptor units of the top two channels are positioned in row 115 which is forwardly of the interceptor units in row 114. The time lapse which occurs enables the use of these pins of the top two channels for the control of motors performing work operations on a piece of lumber after it has been cut and has left the trimmer saw machine. If the motors are fluid motors, each may be provided with a circuit and associated valves operable to produce actuation of the motor on tripping of an interceptor unit which is identical to the circuit and valves regulating motor 78 just described.

In summary, it will be noted that the trimmer saw machine and control enable advance selection of the saw mechanisms which need to be actuated properly to trim a piece of lumber. This selection is done while the lumber is passing through an inspection station in full view of an operator. The selection produces actuation of selected saw mechanisms after a time delay sufficient for a piece of lumber to travel from the inspection station into the work station of the trimmer saw machine. Selections also may be made to control subsequent work operations performed on a piece of lumber after the lumber leaves the trimmer saw work station, as for example a sorting operation requiring the use of a motor operated tipple. Selections are made at a central point, which permits reduction in the number of inspections and inspectors required.

The trimmer saw machine and regulating mechanism of this invention are very versatile and readily adjustable to control any number of trimmer saws. The control mechanism is quite sturdy and will operate over a long period of time and with a minimum amount of breakdown difficulty.

It is claimed and desired to secure by Letters Patent:

1. In a trimmer saw machine for trimming lumber, said trimmer saw machine having a work station comprised of a plurality of power-driven saw mechanisms each independently adjustable between an operative position wherein the saw mechanism cuts lumber passed through the work station and an inoperative position wherein the saw mechanism passes by the lumber without cutting the same, transfer mechanism on the infeed side of said work station delivering lumber thereto, said transfer mechanism comprising a frame and conveyer means transporting lumber across an inspection station located on the infeed side of said work station, and regulator means selectable as the lumber passes said inspection station for adjusting said power-driven saw mechanisms into an operative position after a piece of lumber passes said inspection station, said regulator means having a plurality of selectively actuated selector members, one for each of said saw mechanisms, and detection means for each selector member actuated by actuation of the selector member, said detection means having a trigger means and a mount therefor moving the trigger means in a path conjointly with and at a speed related to the speed of said conveyer means and lumber transported thereon, and an interceptor means engaging said trigger means as it moves in said path after actuation of said detection means, said detection means adjusting the saw mechanism associated therewith to an operative position upon engagement of said intercepter means by said trigger means.

2. In a trimmer saw machine for trimming lumber, said trimmer saw machine having a work station comprised of a plurality of power-driven saw mechanisms each independently adjustable between an operative position wherein the saw mechanism cuts lumber passed through the work station and an inoperative position wherein the saw mechanism passes by the lumber without cutting the same, transfer mechanism on the infeed side of said work station delivering lumber thereto, said transfer mechanism comprising a frame and conveyer means transporting lumber across an inspection station located on the infeed side of said work station, and regulator means selectable as the lumber passes said inspection station for adjusting said power-driven saw mechanisms into an operative position after a piece of lumber passes said inspection station, said regulator means having a trigger means for each of said power-driven saw mechanisms and a mount therefor moving the trigger means in a path conjointly with and at a speed related to the speed of said conveyer means and a piece of lumber transported thereon, remotely actuatable means for each of said trigger means for moving the trigger means from a base to an energizing position, and intercepter means for each of said trigger means engaged by the trigger means in its energizing position as it moves in said path, engagement of said intercepter means by said trigger means being operable to adjust the saw mechanism associated therewith to an operative position.

3. In a trimmer saw machine for trimming lumber, said trimmer saw mechanism having a work station comprised of a plurality of power-driven saw mechanisms each independently adjustable between an operative position wherein the saw mechanism cuts lumber passed through the work station and an inoperative position wherein the saw mechanism passes by the lumber without cutting the same, transfer mechanism on the infeed side of said work station delivering lumber thereto, said transfer mechanism comprising a frame, conveyer means mounted in said frame transporting lumber across an inspection station located on the infeed side of said work station, and regulator means for adjusting said power-driven saw mechanisms into an operative position after a piece of lumber passes said inspection station, said regulator means comprising a control member movable in a path conjointly with said conveyer means, a trigger element for each of said power-driven saw mechanisms mounted in said control member, each for movement between a base and an energizing position, remotely actuatable means for moving independently the trigger element for each saw mechanism from its base to its energizing position, and intercepter means for each of said trigger elements engaged by the trigger element in its energized position as it moves with said control member in said path, engagement of said intercepter means by said trigger element being operable to adjust the saw mechanism associated therewith to an operative position.

4. In a trimmer saw machine for trimming lumber, said trimmer saw machine having a work station comprised of a plurality of power-driven saw mechanisms each independently adjustable between an operative position wherein the saw mechanism cuts lumber passed through the work station and an inoperative position wherein the saw mechanism passes by the lumber without cutting the same, transfer mechanism on the infeed side of said work station delivering lumber thereto, said transfer mechanism comprising a frame, conveyer means mounted in said frame transporting lumber across an inspection station located on the infeed side of said work station, and regulator means for adjusting said power-driven saw mechanisms into an operative position after a piece of lumber passes said inspection station, said regulator means comprising a control member movable in a path conjointly with said conveyer means, a trigger element for each of said power-driven saw mechanisms mounted in said control member, each for movement between a base and an energizing position, a remotely actuatable fluid piston and cam element mounted adjacent said path of said control member, one for each of said trigger elements, and operable on actuation of the fluid piston to move the trigger element associated therewith to its energizing position, intercepter means for each of said trigger elements engaged by the trigger element in its energized position as it moves with said control member in said path, engagement of said intercepter means by said trigger element being operable to adjust the saw mechanism associated therewith to an operative position, and trigger return means in the path of said control member after said intercepter means for returning said trigger elements to their base position.

5. In a lumber trimmer saw machine, said trimmer saw machine having a work station comprised of a plurality of adjustably mounted power-driven circular saw mechanisms each independently adjustable between an operative position wherein the saw mechanism cuts lumber passed through the work station and an inoperative position wherein the saw mechanism passes by the lumber without cutting the same, frame structure including a bed on the infeed side of said work station, conveyer chains mounted in said frame structure for transporting lumber through an inspection station located on said bed and thence into said work station, said conveyer chains having means spaced along the chains whereby successive lumber pieces are transported past said inspection station and into said work station at spaced intervals, and regulator means adjusted when a piece of lumber passes said inspection station for adjusting independently each of said power-driven circular saw mechanisms into an operative position after a time interval elapsing after the piece of lumber passes into said inspection station, said regulator means having a trigger means for each circular saw mechanism and a mount therefor moving the trigger means in a path conjointly with and at a speed related to the speed of said conveyer chains and a lumber piece transported thereon, and an intercepter means associated with each trigger means for engaging said trigger means as it moves in said path, the trigger and intercepter means for each saw mechanism being remotely adjustable so that the trigger means will either engage or not engage its intercepter means while moving in its path, the movement of a trigger means in its path being co-ordinated with the movement of said conveyer chains so that a trigger means is operable to engage its intercepter means before the piece of lumber enters said work station, and means interposed between each intercepter means and its associated circular saw mechanism adjusting the circular saw mechanism to an operative position when the intercepter means is engaged by said trigger means.

6. In combination with a trimmer saw machine, said trimmer saw machine having a work station comprised of a plurality of power-driven saw mechanisms each independently adjustable between an operative position wherein the saw mechanism cuts lumber passed through the work station and an inoperative position wherein the saw mechanism passes by the lumber without cutting the same, and transfer mechanism on the infeed side of said work station delivering lumber thereto, said transfer mechanism having conveyer chains adapted to move lumber at spaced intervals past an inspection station located in front of the work station and thence into said work station, regulator means adjustable when a piece of lumber passes said inspection station controlling the power-driven saw mechanisms when said piece of lumber enters said work station, said regulator means comprising a belt means connected to said conveyer chains and moving at a speed related thereto, a series of control members carried at spaced intervals on said belt means, and remotely controlled and selectively adjustable means carried by each of said control members for controlling the adjustment of said power-driven saw mechanism to an operative position.

7. In combination with a trimmer saw machine, said trimmer saw machine having a work station comprised of a plurality of power-driven saw mechanisms each independently adjustable between an operative position wherein the saw mechanism cuts lumber passed through the work station and an inoperative position wherein the saw mechanism passes by the lumber without cutting the same, and transfer mechanism on the infeed side of said work station delivering lumber thereto, said transfer mechanism having conveyer chains adapted to move lumber at spaced intervals past an inspection station located in front of the work station and thence into said work station, regulator means adjustable when a piece of lumber passes said inspection station controlling the power-driven saw mechanisms when said piece of lumber enters said work station, said regulator means comprising a belt means connected to said conveyer chains and moving at a speed related thereto, a series of control members carried at spaced intervals on said belt means, a plurality of adjustable trigger elements, one for each of said saw mechanisms, mounted on each of said control members, said trigger elements being adjustable between base and energizing positions, remotely controlled means for adjusting said trigger elements selectively from a base to an energizing position, and an intercepter means for each of said saw mechanisms for engaging one of the trigger elements on each control member as the control members are carried along by said belt means and engageable with the trigger elements when the latter are in an energizing position.

8. A control mechanism for a lumber trimmer saw machine, said trimmer saw machine having a work station comprised of a power-driven saw mechanism adjustable between an operative position wherein the mechanism cuts lumber passed through the work station and an inoperative position wherein the saw mechanism passes by the lumber without cutting the same, said control mechanism comprising a continuous belt means, means for rotating said belt means, a plurality of control members carried by said belt means and spaced at regular intervals therealong, a trigger means mounted on each of said control members, said belt means transporting the trigger means and control members in a path through said control mechanism, the trigger means for all of said control members moving in a common channel through said control mechanism, remotely actuatable means for moving a trigger means carried by a control member from a base to an energizing position as the trigger means moves past a setting station located in the channel, and intercepter means positioned in the channel for said trigger means and spaced from said setting station engaged by a trigger means when it is in its energizing position and as it moves beyond said setting station, said intercepter means adjusting the saw mechanism of said trimmer saw machine from an inoperative to an operative position.

9. A control mechanism for a lumber trimmer saw machine, said trimmer saw machine having a work station comprised of a plurality of power-driven saw mechanisms independently adjustable between an operative position wherein the saw mechanism cuts lumber passed through the work station and an inoperative position wherein the saw mechanism passes by the lumber without cutting the same, said control mechanism comprising a continuous belt means, means for rotating said belt means, a plurality of control members carried by said belt means at regular intervals therealong, a plurality of control members carried by said belt means and spaced at regular intervals therealong, a set of trigger means mounted on each of said control members, said belt means transporting the trigger means and control members in a path through said control mechanism, each trigger means of one of said control members moving in a common channel with a corresponding trigger means carried by each of the other control members, remotely actuatable means for moving a trigger means carried by a control member from a base to an energizing position as the trigger means moves past a setting station located in the channel, and intercepter means positioned in each of the channels and spaced from said setting station engaged by a trigger means when it is in its energizing position and as its moves beyond said setting station, said intercepter means adjusting the saw mechanisms of said trimmer saw machine from an inoperative to an operative position.

References Cited in the file of this patent
UNITED STATES PATENTS

| | | |
|---|---|---|
| 2,332,654 | Mead et al. | Oct. 26, 1943 |
| 2,616,501 | Smith | Nov. 4, 1952 |
| 2,652,864 | De Anguera | Sept. 22, 1953 |
| 2,679,919 | De Koning | June 1, 1954 |
| 2,711,197 | De Koning | June 21, 1955 |
| 2,714,407 | Pearson | Aug. 2, 1955 |
| 2,745,446 | Deiry et al. | May 15, 1956 |